(12) United States Patent
Howisen

(10) Patent No.: US 6,332,533 B1
(45) Date of Patent: Dec. 25, 2001

(54) MEDIA HOLDER MOUSE PAD

(75) Inventor: Harry J. Howisen, Orlando, FL (US)

(73) Assignee: H.H.H. Incorprorated, Chesterton, IN (US)

( * ) Notice: Subject to any disclaimer, the term of this patent is extended or adjusted under 35 U.S.C. 154(b) by 0 days.

(21) Appl. No.: 09/651,550

(22) Filed: Aug. 29, 2000

(51) Int. Cl.$^7$ ............................................. B65D 85/57
(52) U.S. Cl. ............................... 206/307.1; 206/308.3; 312/111; 108/14; 220/4.24; 220/23.4
(58) Field of Search .......................... 206/307.1, 308.1, 206/308.3, 311, 312, 232, 223, 576, 504; 220/4.21, 4.24, 23.4, 23.83, 23.86, 326; 312/108, 110, 111, 263; 273/285, 287, 309; 446/75; 108/14

(56) References Cited

U.S. PATENT DOCUMENTS

| | | | | |
|---|---|---|---|---|
| 3,851,936 | * | 12/1974 | Muller ................................ | 312/108 |
| 4,523,680 | * | 6/1985 | Saito et al. .......................... | 206/387 |
| 4,875,688 | * | 10/1989 | Whaley .............................. | 273/285 |
| 4,889,254 | * | 12/1989 | Vola ................................. | 220/23.4 |
| 5,050,755 | * | 9/1991 | Strawder ........................... | 320/23.4 |
| D365,342 | * | 12/1995 | Everson et al. ................... | D14/114 |
| D368,081 | * | 3/1996 | Comley ............................. | D14/114 |
| 5,533,697 | * | 7/1996 | Fletcher et al. .................... | 248/146 |
| 5,628,483 | * | 5/1997 | Smith et al. ........................ | 248/118 |
| 5,692,815 | * | 12/1997 | Murphy ............................. | 312/283 |
| D402,276 | * | 12/1998 | Yu .................................... | D14/114 |
| 6,019,219 | * | 1/2000 | Takahashi ........................ | 206/387.1 |
| 6,050,657 | * | 4/2000 | Hiltzman ........................... | 312/111 |
| 6,206,193 | * | 3/2001 | Wu ................................... | 206/575 |

* cited by examiner

Primary Examiner—Paul T. Sewell
Assistant Examiner—Jila M. Mohandesi
(74) Attorney, Agent, or Firm—Brian S. Steinberger; Law Offices of Brian S. Steinberger

(57) ABSTRACT

A media holder mouse pad having an upper half casing and a bottom half casing that when sandwiched together forms a storage compartment therebetween for storing 3.5 inch floppy diskettes, CDs, DVDs, mini DVDs, and the like. In the diskettes/disk storage mode, the casing can be but not limited to triangular, rectangular, and polygonal shapes and can easily be placed in the mail and/or stored similar to traditional diskette/disc cases. The upper half casing and the bottom half casing can be completely separated and has connectors on their respective sides for allowing each half to be attached in a side by side arrangement so that it can be used as a work surface for supporting mouse pads, and the like. The arrangement is expandable so that other casing halves can be attached side by side so that a larger workplace surface can be formed for supporting other objects such as laptop computers and the like. Additionally, the casings can be attached side-by-side in a similar manner without having to separate the top and bottom halves.

15 Claims, 11 Drawing Sheets

MEDIA HOLDER MOUSE PAD

This invention relates to mouse pads, and in particular to a novel case holder for floppy diskettes, compact disks (CDs), DVD disks, mini DVD disks, and the like, having top and bottom halves that can connect side-by-side to each other to form a mouse pad surface, and can also be enlarged by interconnecting with additional case holders to be used as a portable tabletop surface.

BACKGROUND AND PRIOR ART

One of the major driving forces within the current corporate and consumer environment is technology. On a daily basis technology affects the decisions of both corporate executives and the consumer. On average, technology influences corporations to reduce their bottom line spending by replacing costly out of date business methods with new media and systems that are available to them. In a similar manner, these technological forces also drive consumers to find ways to save time and make daily life more convenient.

As a result of the interaction of these forces in the corporate and consumer environment, an interesting niche has developed. The niche that has emerged is the need for an inexpensive, easy to manufacture product that increases corporate cost efficiency and improves end user convenience through multi functionality and reusability. The media holder mouse pad is the device that can fulfill this niche.

Currently many corporations have chosen to distribute media via floppy diskettes and compact discs instead of in the traditional form of print catalogs and leaflets. Though corporations are cutting bottom line costs through this transition, they still have wasted dollars tied to the disposable packaging of this digital media.

Many diskette and compact disc storage cases have been designed, but they do not address this need for a multifunctional, reusable and ready to be mailed storage device. For example, see U.S. Pat. No. 5,823,334 to Giovanni and U.S. Pat. No. 6,029,848 to Cha et al.

Modifications of the disk storage box have been proposed. See U.S. Pat. No. 5,339,950 to Li. However, the Li patent is limited to a storage box having an extendible lid that can be used to hold pieces of paper. Due to its' design, Li's device requires multiple separate pieces which not only increases the cost and difficulty of manufacturing it, but also reduces its practicality for other applications. For instance, the Li device could not be used as a mouse pad since the raised clip on the lid of the box would interfere with the user's movement.

The traditional mouse pad also does not fill that niche either. Instead, a traditional pad generally remains on the user's desktop and is typically not transported because it is difficult to use when traveling.

In addition to the aforementioned limitations, many computer users have also encountered the problem of running out of work space on the traditional mouse pad. In U.S. Pat. No. Des. 395,876 to Afarian, a mouse pad with "interlocking pieces" was proposed. Afarian required that one piece be laid over the other piece creating a larger surface area. However, this design produces uneven edges at the point of connection which can be difficult to flatten due to the use of flexible material(such as foam). Furthermore, Afarian's pad limits itself on its size since the pad can only be as large as the size of two interlocking pieces.

Several other modified mouse pads have been proposed over the years. U.S. Pat. No. Des. 411,192 to Wu; U.S. Pat. No. Des. 361,326 to Schriner and U.S. Pat. No. 5,542,637 to Schriner describe mouse pads having storage containers. The Wu patent requires a separate compartment mounted on the side of a mouse pad, that is limited to being able to store a computer mouse. As for the Schriner patents, they require pivotal hinges and a sloped exterior top surface with extra material for supporting one's wrist, as well as a storage compartment that "is preferably partitioned . . . (for the storage of) pencils, pens, pads, and paper clips."

Other patents of interest that also fail to overcome the problems with the prior art include U.S. Pat. No. Des. 428,418 to Benedict et al.; U.S. Pat. No. 5,636,746 to McQueeny; U.S. Pat. No. 5,666,265 to Lutz et al.; and U.S. Pat. No. 5,699,059 to Hiller.

SUMMARY OF THE INVENTION

The primary objective of this invention is to provide a media holder mouse pad that stores floppy diskettes, compact discs, DVD disks, mini DVD disks, and the like, therein, and is easy to mail and easy to display at retail.

The second objective of this invention is to provide a media holder mouse pad that initially stores diskettes and discs, and can be opened up so that the top and bottom halves can be reconnected to be used as a mouse pad.

The third objective of this invention is to provide a media holder mouse pad that is expandable in four directions to create a larger surface area for a computer mouse.

The fourth objective of this invention is to provide a media holder mouse pad having a casing for storing diskettes and disks therein that can be opened up to become a tabletop surface for a laptop computer.

The fifth objective of this invention is to provide a media mouse holder pad having a casing for storing diskettes and discs therein that can be opened up to become a tabletop surface for use as a worktable.

The sixth objective of this invention is to provide a media holder mouse pad having a case for storing diskettes and discs therein that can be opened up to be used as an advertising opportunity.

A preferred embodiment of the invention includes converting media storage cases into a work surface. The storage cases can be shaped rectangular, triangular, polygonal or flat sided. Each case has a top half member, a bottom half member and a storage space inbetween when both half members are sandwiched together. The compartment can store 3.5 inch diskettes, compact disks, DVDs, mini DVDs, and the like. Connectors on the exterior side edges of each half allow each half to be attached side by side to one another. Male protruding members such as longitudinal T-shaped members can be on sides of one half while mateable longitudinal T shaped female indentations can be on sides of the other half so that the male members can slide into the female indentations forming a tight fit. The male members can extend perpendicular from the sides of the halves and the indentations can also be perpendicular to the sides of the halves. The attached halves can be flipped over and used as a mouse pad work surface. Additional raised members and indentations can be on the other sides of the halves for allowing other halves of other cases to be similarly attached to create a larger work surface for computer mouse users, laptop computers and the like. The cases can also be similarly attached side-by-side to one another without separating the halves.

Further objectives and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
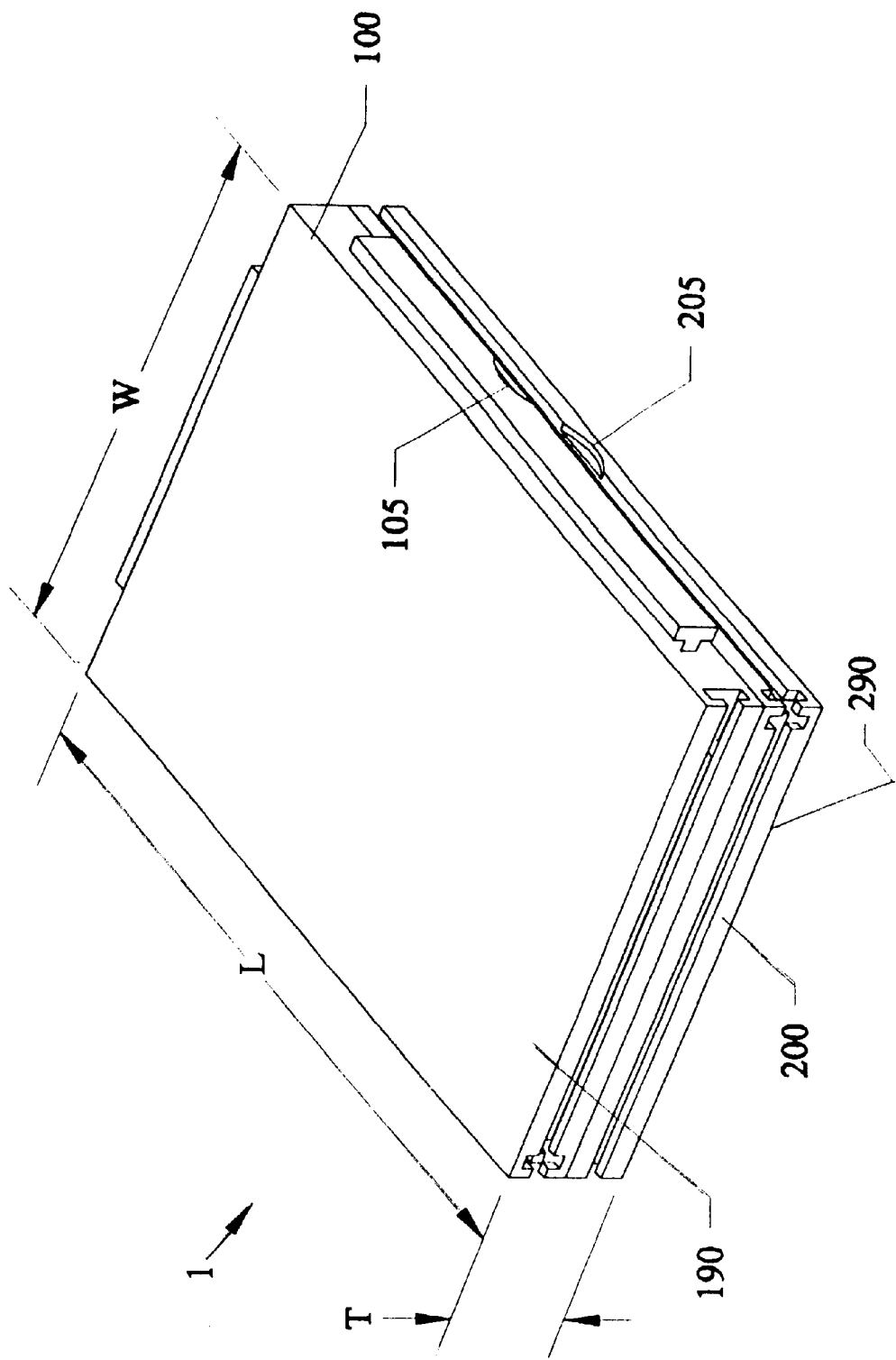
FIG. 1A is a perspective view of novel media holder with the top and bottom halves in a disc/disk storage mode.
Figure 1B:
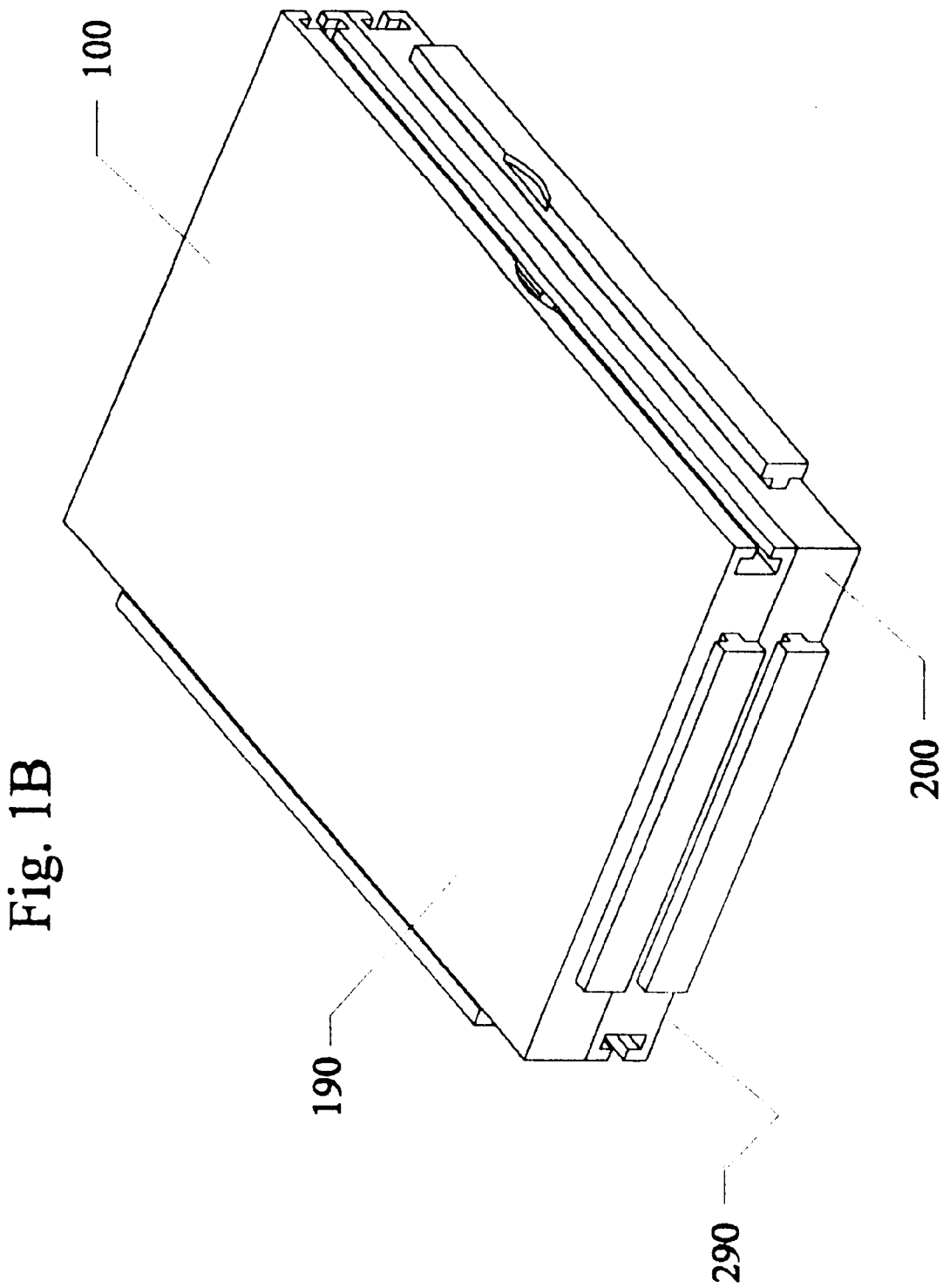
FIG. 1B another perspective view of the media holder of FIG. 1 A rotated 180 degrees.

FIG. 1A is a perspective view of novel media holder 1 with the top and bottom halves 100, 200 in a disc/disk storage mode. FIG. 1B another perspective view of the media holder 1 of FIG. 1A rotated 180 degrees with outer surfaces 190 and 290 being substantially flat planar surfaces. The novel media holder 1 can be formed from injection molded plastic having a width of approximately 4 to approximately 7 inches, a length L, of approximately 5 to approximately 10 inches and a thickness T, of approximately ¼ to approximately 1.5 inches, with a storage space therein which will be later explained in greater detail.

Figure 2A:
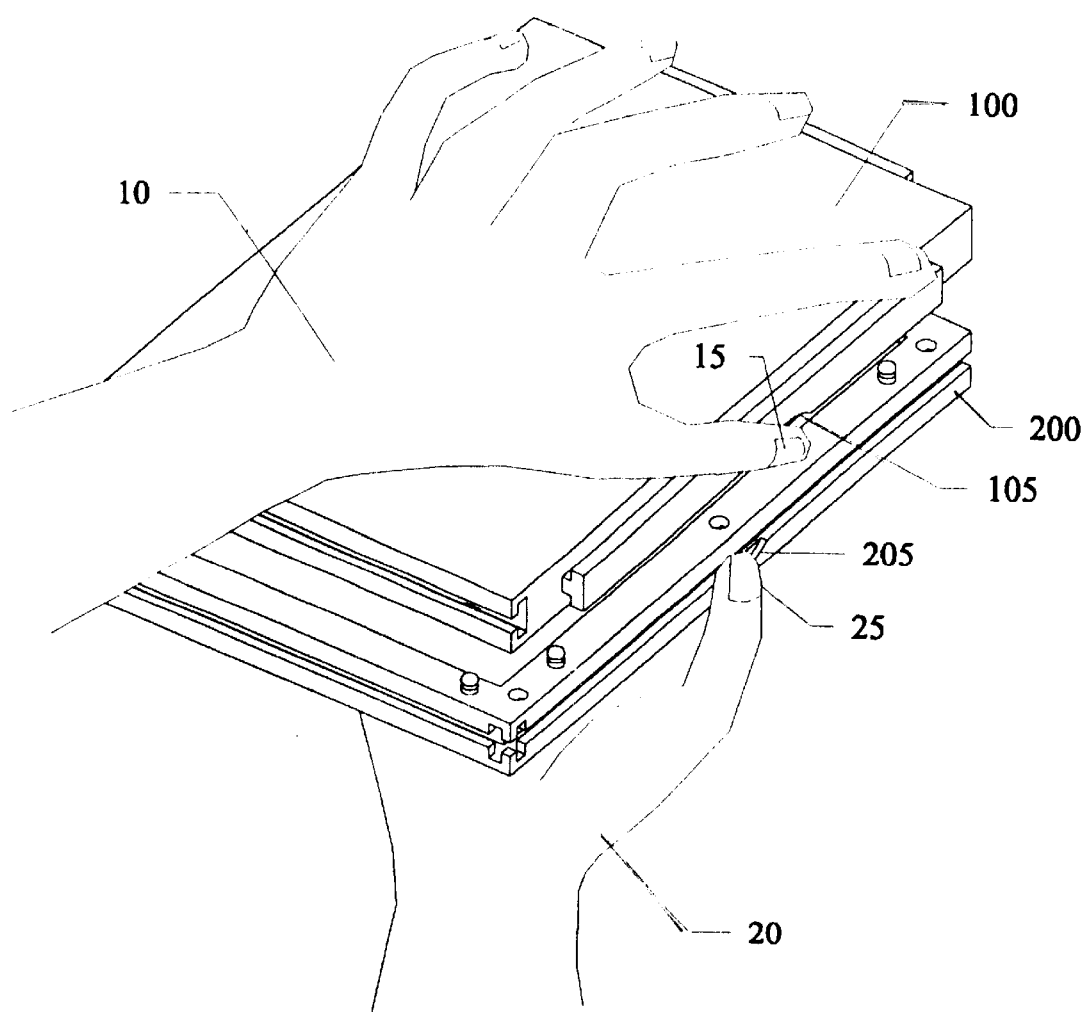
FIG. 2A shows a user separating the top and bottom halves of FIG. 1A apart.

FIG. 2A shows a user separating the top 100 and bottom halves 200 of FIG. 1B apart. For example a user's left hand can be laid over the top of the holder 1, palm side facing down with the left thumb pressed into an arc shaped indentation 105 in the side of top half 100. The user's right hand can be placed underneath the holder 1 with palm side facing up and their right thumb pressed in an arc shaped indentation 205 in the side of bottom half 200. The top half 100 can then be pulled apart from the bottom half 200.

Figure 2B:
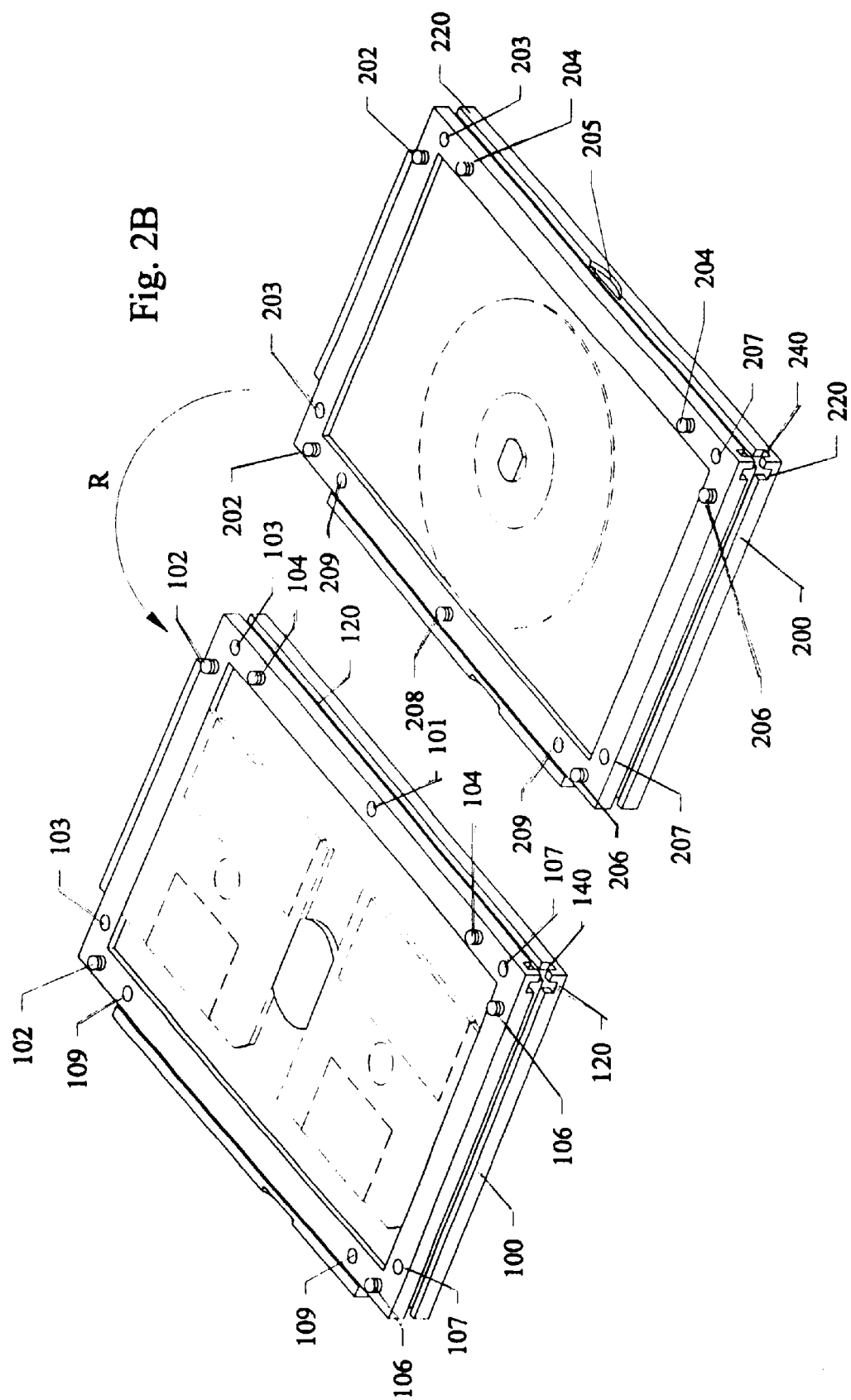
FIG. 2B shows the top half and the bottom half of the holder of the preceding figures separated from one another with floppy diskettes and discs stored inside.

FIG. 2B shows the top half 100 and the bottom half 200 of the holder 1 of the preceding figures separated from one another, where top half 100 was removed and flipped over in the direction of arrow. FIG. 2B shows the snapable fasteners that allow the top half 100 to be attached to the bottom half 200 in the sandwich position shown in the preceding figures. Top half 100 has male protruding members 102, 104, 106, that can mateably and snapably fit within female receptors 203, 209, 207, respectively of bottom half 200. Likewise bottom half 200 has male protruding members 202, 204, 206, 208 that can mateably and snapably fit within female receptors 103, 109, 107, 101, respectively of top half 100.

Figure 2C:
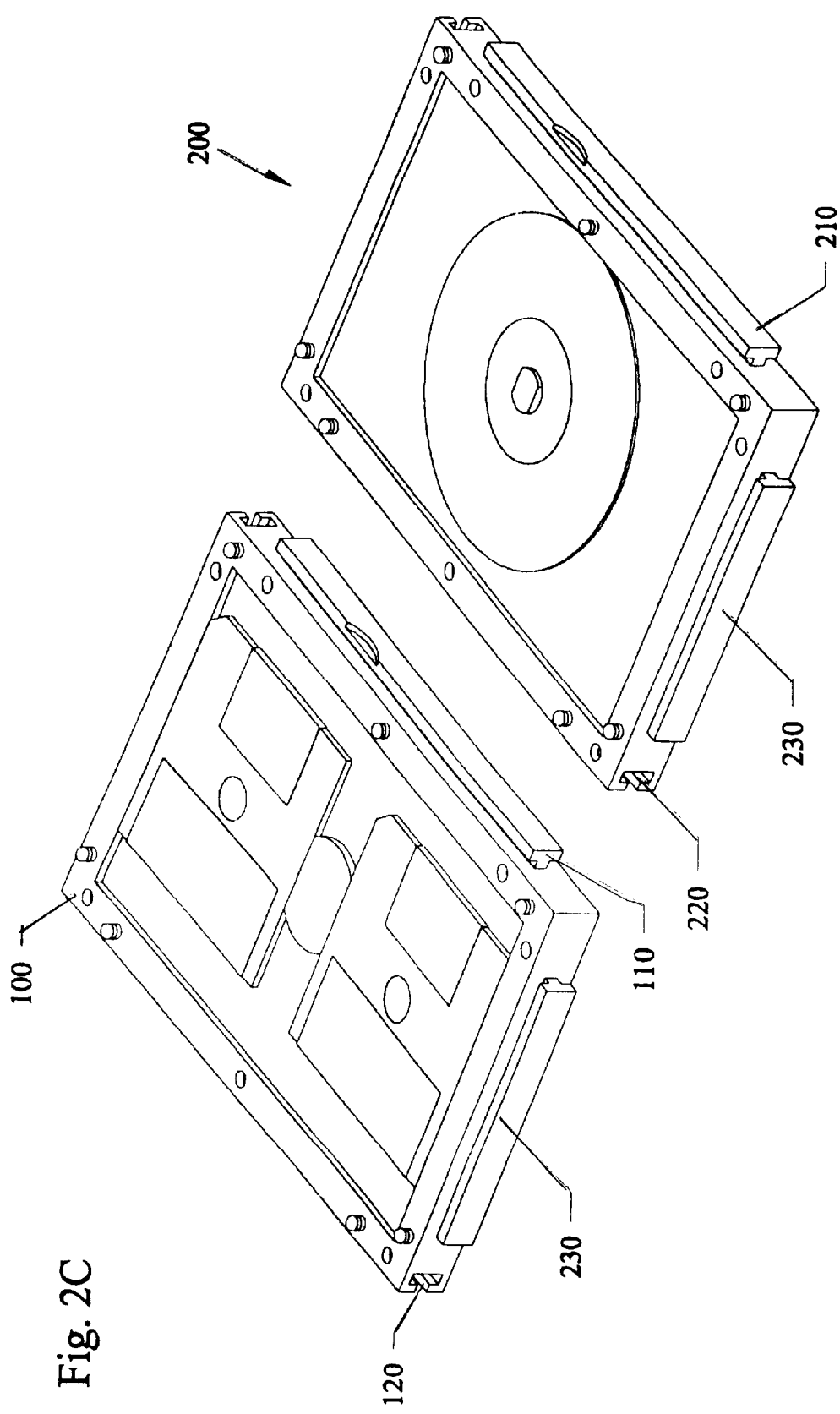
FIG. 2C shows the top half and the bottom half of FIG. 2A each having been rotated 180 degrees.

FIG. 2C shows the top half 100 and the bottom half 200 of FIG. 2A each having been rotated 180 degrees. Along a long side of top half 100 is a raised member 110 having a T-cross-sectional shape molded thereon, and along a short side of half 100 is another raised member 130 also having a T cross-sectional shape molded thereon. On the opposite long side of half 100 is longitudinal indentation 120 having a T cross-sectional shape(FIG. 2B shows a similar T shaped indentation 140 on the side opposite to raised member 130). Similarly, along a long side of bottom half 200 is a raised member 210 having a T cross-sectional shape molded thereon, and along a short side of half 200 is another raised member 230 also having a T cross-sectional shape molded thereon. On the opposite long side of half 200 is longitudinal indentation 220 having a T cross-sectional shape(FIG. 2B shows a similar T shaped indentation 240 on the side opposite to raised member 230). It is important to note that the raised members 110, 130, 210, 230 can be slightly shorter than the lengths and widths of the sides of the halves 100, 200, while the indentations 120, 140, 220, 240 can run the entire length of the sides of the halves 100, 200. The T-shaped indentations can be sized to mateably and tightly receive the raised T-shaped members.

Figure 3:
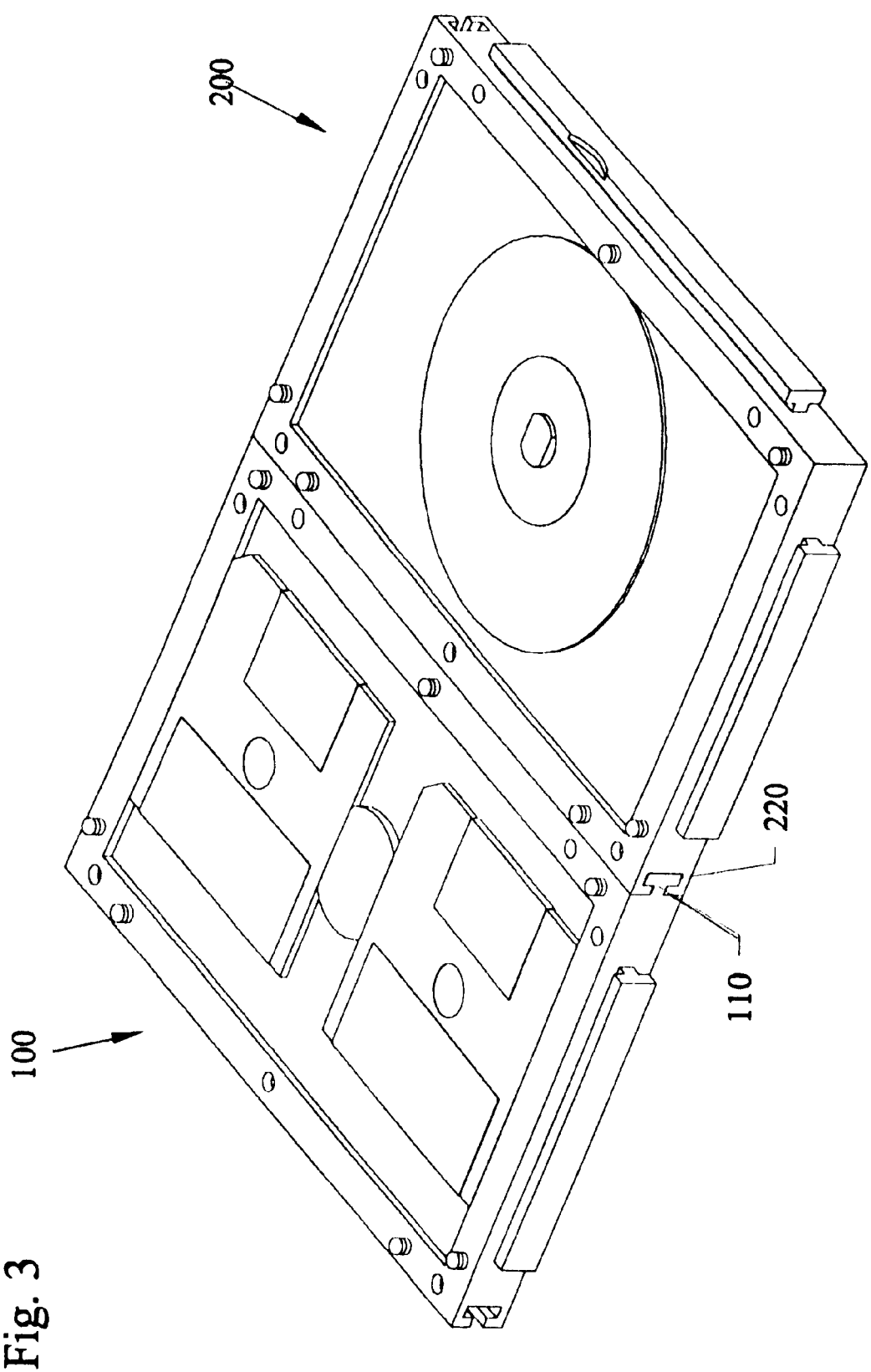
FIG. 3 shows the top half and bottom half of the proceeding figures interlocked to one another.

FIG. 3 shows the top half 100 and bottom half 200 of the preceding figures interlocked to one another where raised member 110 has been slid into mateable indentation 220.

Figure 4:
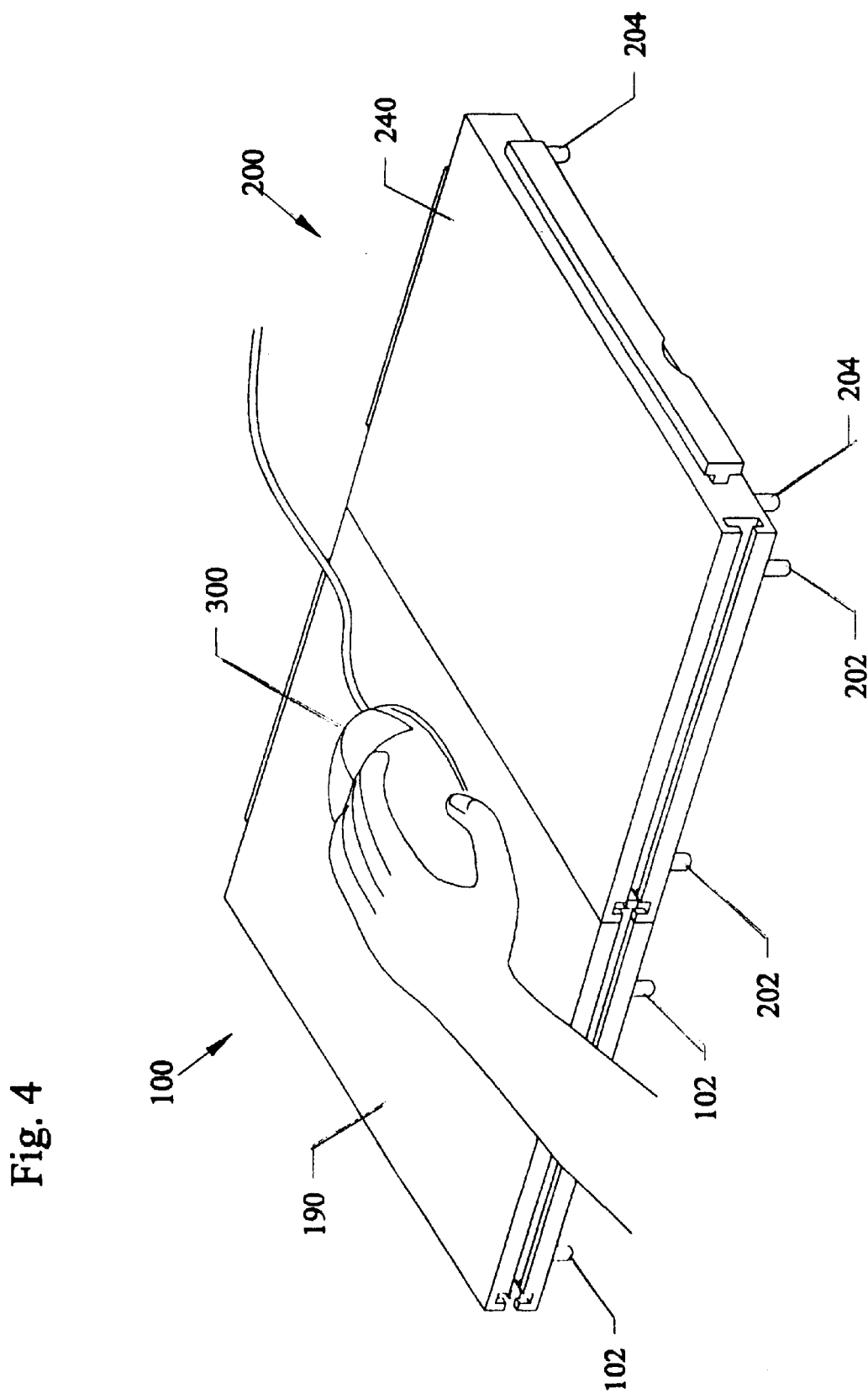
FIG. 4 shows the interlocked halves of FIG. 3A turned upside down to be used as a mouse pad.

FIG. 4 shows the interlocked halves of FIG. 3A turned upside down to be used as a mouse pad where flat exterior outer face 190 of top half 100 and flat exterior outer face 290 of bottom half 200 are now side-by-side, and the male protruding members 102, 202, 204 and other members more clearly shown in FIG. 2B are now used as table legs for supporting a computer mouse 300 on surfaces 190, 290 which can be used as a mouse pad.

Figure 5:
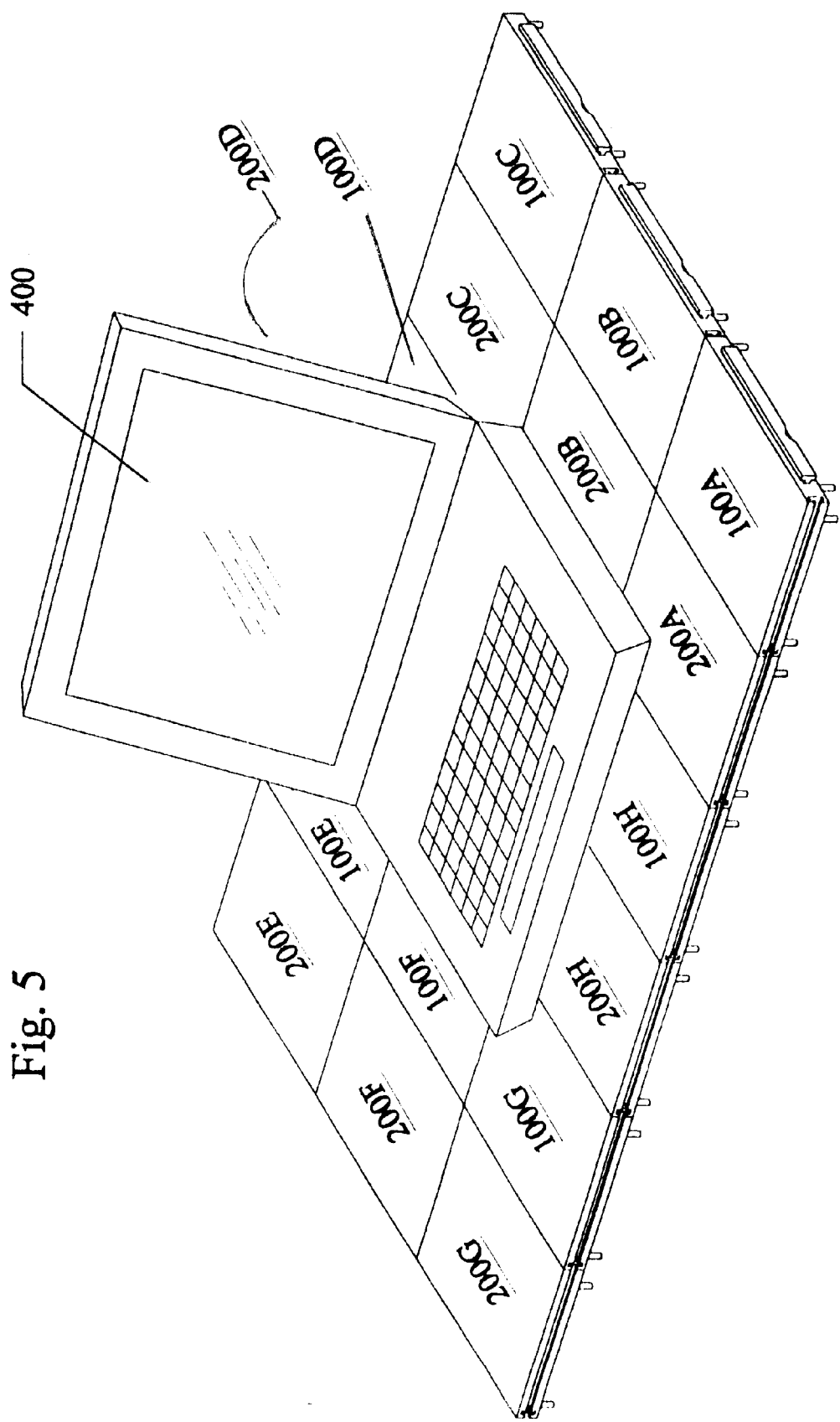
FIG. 5 shows plural halves of plural holders interconnected to form an enlarged work surface.

FIG. 5 shows plural halves 100A/200A, 100B/200B, 100C/200C, 100D/200D, 100E/200E, 100F/200F, 100G/200G of plural holders interconnected to form an enlarged work surface that can be used to support a computer 400 such as a laptop computer.

Figure 6:
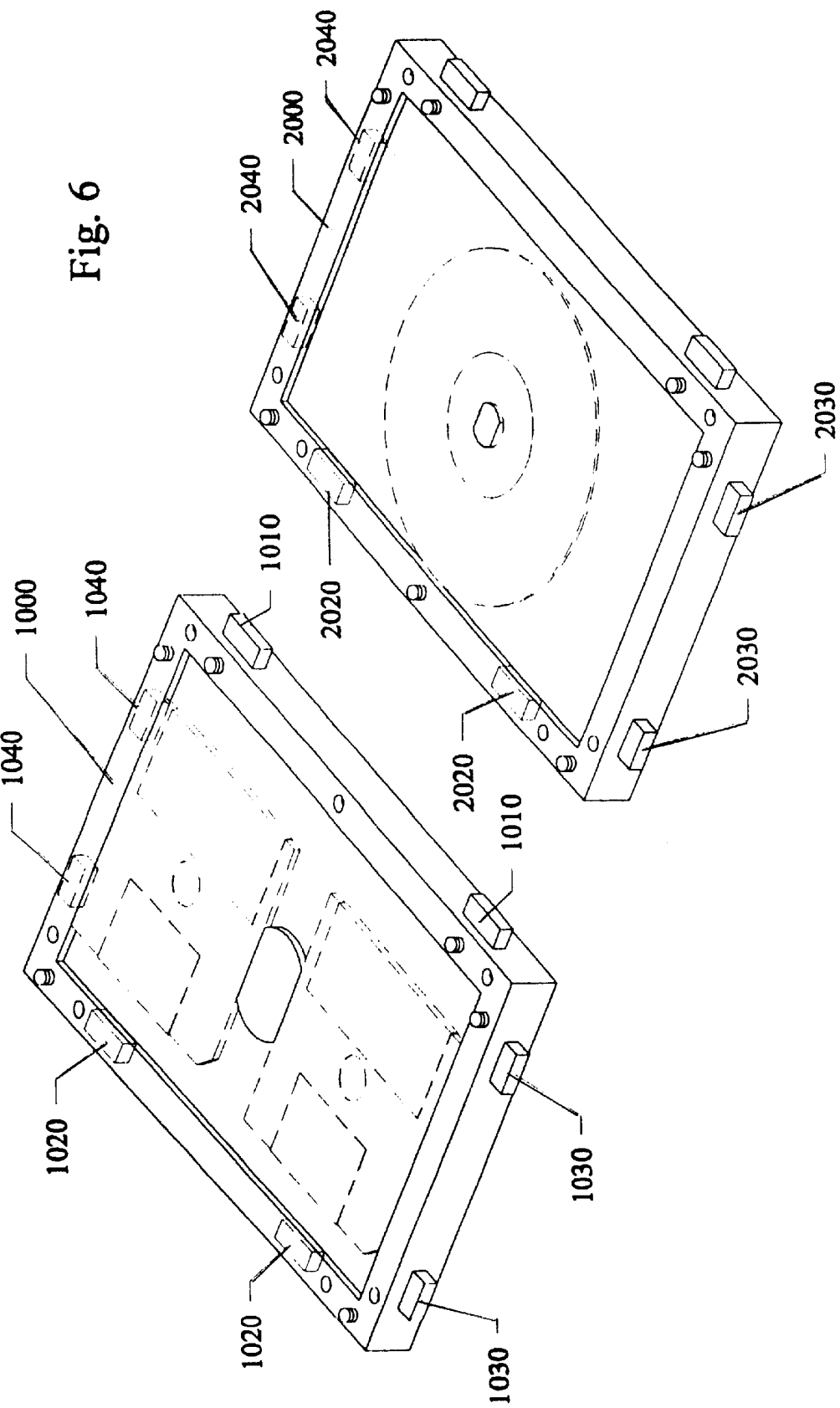
FIG. 6 shows another embodiment of the top half and the bottom half using male and female connectors, with each half having floppy diskettes and discs stored inside.

FIG. 6 shows another embodiment of using male and female connectors. Here top half 1000 can have male protruding prongs 1010, 1030 perpendicular to a long and short exterior side edge, and female receptacles 1020, 1040 on opposite sides. Bottom half 2000 can have male protruding prongs 2010, 2030 perpendicular to a long and short exterior side, and female receptacles 2020, 2040 on opposite sides. The male prongs of one half can thus mateably interlock with the female receptacles on the other half in a manner similar to that previously described.

Figure 7:
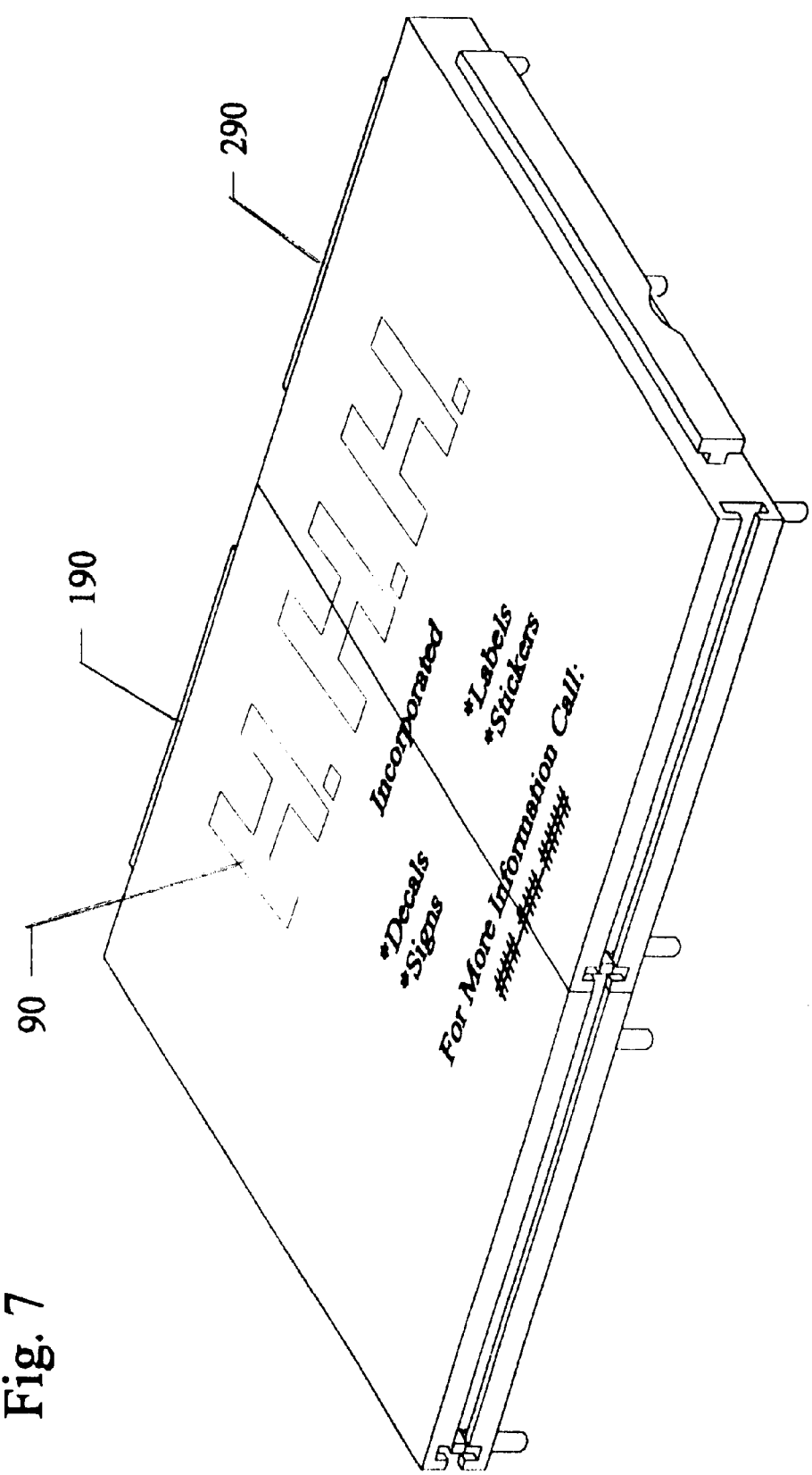
FIG. 7 shows the interconnected halves with advertising indicia thereon.

FIG. 7 shows the interconnected halves 100, 200 of the preceding figures with advertising indicia 90 thereon.

Figure 8:
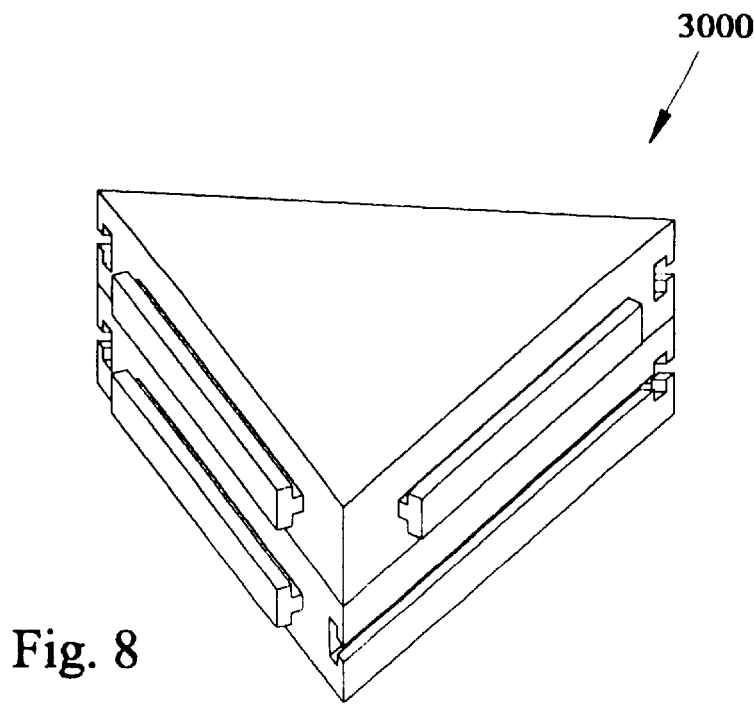
FIG. 8 is a perspective view of another novel media holder having a triangular shape.

FIG. 8 is a perspective view of another novel media holder 3000 having a triangular shape.

Figure 9:
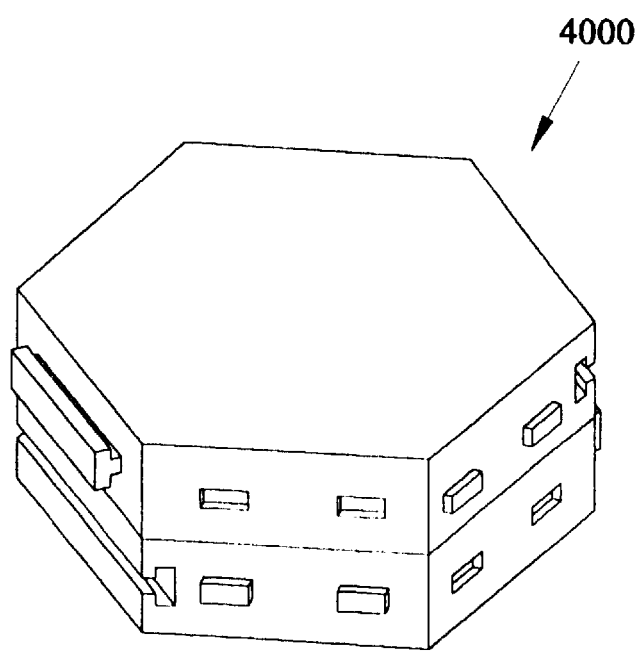
FIG. 9 is a perspective view of another novel media holder having a polygonal shape.

FIG. 9 is a perspective view of another novel media holder 4000 having a polygonal shape.

Both the holders of FIGS. 8–9 having similar connector members to those described in the previous embodiments, and connect with one another similarly to those previously described.

While the embodiments described above show cases having rectangular, triangular and polygonal shapes, the invention can be used with other shapes having flat straight sides.

The planar work surface can be used on a desk, on carpeting, on a bed, and on ones lap to create a quickly assembled work table. Besides computer applications, the work table can be support food and beverages for students, families, and the like.

Although the preferred embodiments show separating the top half from the bottom half to interlock the two to form a work surface, the novel case holders can be interconnected with each other where the top halves and the bottom halves are already sandwiched together.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A holder device, comprising in combination:
    a top half member;
    a first connector member along a side of the top half member;
    a bottom half member;
    a second connector member along a side of the bottom half member, the second connector member for mateably attaching to a portion of the first connector member while the top half member is slided along the side of the bottom half member from adjacent one end to adjacent an opposite end, wherein attaching the top half member to the bottom half member forms an enlarged work surface;
    a storage space formed between the top half member and the bottom half member when the top half member and the bottom half member are sandwiched together; and
    at least one of: a computer mouse for using the work surface as a mouse pad, and a computer for using the work surface to support the computer.

2. The holder of claim 1, wherein the storage space further includes:
    a compartment for storing at least one of a diskette and a disc.

3. The holder of claim 1, wherein the first connector member and the second connector member are chosen from:
    a male member; and
    a female member, wherein the male member mateably fits within the female member.

4. The holder of claim 1, wherein the first connector member and the second connector member are chosen from:
    a raised member longitudinally along one side; and
    an indented portion longitudinally along one side, wherein the first raised member slides into the indented member.

5. The holder of claim 4, wherein the first raised member has a substantially T-shape; and the indented portion has a mateable substantially T-shape for receiving the first substantially T-shape.

6. The holder of claim 1, wherein the first connector member is on at least two sides of the top half member.

7. The holder of claim 1, wherein the second connector member is on at least two sides of the bottom half member.

8. The holder of claim 1, wherein the first connector member is on at least two sides of the top half member, and the second connector member is on at least two sides of the bottom half member.

9. A convertible media holder that can be used as a work board, comprising in combination:
    a first case for storing first media, having a first connector member along one side, and a second connector member along another side, the second connector member being different from the first connector member;
    a second case for storing second media having a third connector member along one side, and a fourth connector member along another side, wherein the first connector member is identical in shape to the third connector member, and the second connector member is identical to the fourth connector member, wherein the first connector member can mateably attach to the fourth connector member and the second connector member can mateably attach to the third connector member, so that attaching the first case and the second case together forms a work board; and
    at least one of: a computer mouse for using the work table as a mouse pad, and a computer for using the work table to support the computer.

10. The convertible media holder of claim 9, wherein the first media and the second media are chosen from at least one of: diskettes, and disks.

11. The convertible media holder of claim 9, wherein the first connector member, the second connector member, the third connector member, and the fourth connector member, are chosen from:
    a male member on the side of the first case; and
    a female member on the side of the second case that mateably receives the male member of the first case.

12. A case that is convertible to a work surface, comprising in combination:
    a top lid having a first connector member along one side, and a second connector member along a different side, the first connector member being different from the second connector member;
    a bottom lid having one connector member along one side, and another connector member along a different side, wherein the first connector member of the top lid is identical to the one connector member of the bottom lid, and the second connector member of the top lid is identical to the another connector member of the bottom lid, the first connector member mateably attaches to the another connector member forming a work surface; and
    snap means for joining the top lid to the bottom lid in a sandwich configuration to form a closed compartment between the top lid and the bottom lid, the snap means being different from the first and the second and the one and the another connector members.

13. The case of claim 12, wherein the top lid further includes:
    a third connector member along a third side, and a fourth connector member along a fourth side, the third connector member is different from the fourth connector member, and the third connector member is identical to the first connector member, and the fourth connector member is identical to the second connector member; and
    wherein the bottom lid further includes:
    a still another connector member along a third side, and an additional connector member along a fourth side, the still another connector member being different from the additional connector member, the still another connector member being identical to the one connector member, and the additional connector member being identical to the another connector member.

14. The case of claim 13, further comprising:

a second case having a top lid and a bottom lid, the second case being identical to the first case, and the top lid and the bottom lid of the second case being attachable to the top lid and the bottom lid of the first case.

15. The case of claim 9, wherein the first case further includes:

a one connector member along a third side, and another connector member along a fourth side, the one connector member is different from the another connector member, and the first connector member is identical to the one connector member, and the second connector member is identical to the another connector member; and wherein the second case further includes:

a still another connector member along a third side, and an additional connector member along a fourth side, the still another connector member being different from the additional connector member, the still another connector member being identical to the third connector member, and the additional connector member identical to the fourth connector member.

* * * * *